ތ
3,154,544
Patented Oct. 27, 1964

3,154,544
SUBSTITUTED MORPHOLINES
William K. Langdon, Grosse Ile, and Ernest Jaul and William W. Levis, Jr., Wyandotte, Mich., assignors to Wyandotte Chemicals Corporation, Wyandotte, Mich., a corporation of Michigan
No Drawing. Filed May 2, 1956, Ser. No. 582,078
18 Claims. (Cl. 260—247)

This invention relates to a method for preparing substituted morpholines. In a more specific aspect, this invention relates to a new method for preparing carbon-substituted morpholines with high conversions and high yields.

The commercial importance of morpholines is presently undergoing a rapid growth in production and uses. Substituted morpholines can be used in industrial cleaners, as oil additives, petroleum de-emulsifying agents, textile wetting agents, and high-temperature or high-pressure lubricants. Substituted morpholines are also useful as a component of wax emulsions and as an intermediate in the preparation of rubber accelerators and plasticizers.

Dehydration of diethanolamine is the basis for a method used in industry for the synthesis of morpholine itself. Thus, morpholine has been produced by heating diethanolamine and an excess of concentrated hydrochloric acid in a sealed tube, and then refluxing the reaction mass with potassium hydroxide. Also, diethanolamine has been dehydrated employing 70% sulfuric acid, and a 40–48% yield to morpholine is reported by this general method. U.S. 2,129,805, Alexander L. Wilson, patentee, discloses a method of synthesizing morpholine or substituted morpholines by treating under pressure a $\beta',\beta'$ dihalogenated dialkyl ether, such as $\beta,\beta'$ dichlorodiethyl ether, with ammonia in a molar ratio of at least 5:1 to produce morpholine hydrohalide, followed by treating the resultant mixture with an excess of caustic alkali to convert the intermediate to morpholine.

The dehydration method referred to, the only important industrial method, suffers from the disadvantages of requiring an excess of acid with its attendant corrosiveness and problems of separating a salt cake. A starting material costing less than diethanolamine is desirable, also.

U.S. 2,529,923, Joseph B. Dickey et al., patentees, teaches a method for preparing 2-(2-hydroxyethoxy) ethylamine wherein diethylene glycol was reacted with ammonia in the presence of a nickel catalyst by heating under liquid phase conditions for 37 hours. It is stated by Dickey et al. that a good yield of 2-(2-hydroxyethoxy) ethylamine was obtained and the description also states that morpholine was obtained. The percent conversion to morpholine must have been small, particularly because morpholine was apparently only a by-product of the process which was stated to produce good yields of 2-(2-hydroxyethoxy)ethylamine. Some doubt can be raised that morpholine was produced at all inasmuch as Dickey et al. state that the boiling point of the by-product "morpholine" was 182–184° C. at 745 mm. Hg, whereas the boiling point of morpholine actually is 126–130° C. under standard conditions. (See "Handbook of Chemistry and Physics," Chemical Rubber Publishing Co., 37th Edition, 1955–1956.)

A morpholine compound cannot be produced with substantial conversions or yields by reacting diethylene glycol with ammonia as is shown by the data in our Example VI herein. Only about 10% conversion to morpholine was obtained in this reaction.

An object of this invention is, therefore, to provide a new and improved method for preparing substituted morpholine compounds.

A further object of this invention is to provide a new and improved method for preparing carbon-substituted morpholines with high conversions and yields.

A still further object is to provide a method for preparing alkyl-substituted morpholines, such as dimethylmorpholines, with high conversions and yields.

In contrast to the low conversion obtained in the run in our Example VI herein employing diethylene glycol, hydrogen, water and ammonia as the reactants, and in contrast to the apparently negligible percent conversion to morpholine obtained by Dickey et al. with diethylene glycol under liquid phase conditions, we have discovered that substituted morpholine compounds can be produced with an unexpected and most important increase in conversion and yield when dialkylene glycols having certain characteristic features not found in diethylene glycol, as exemplified by dipropylene glycol, are employed as the starting material in preparing substituted morpholine compounds. Further characterizing features of the method of our invention are that the reaction is carried out in vapor phase in the presence of hydrogen. One essential distinguishing characteristic of the dialkylene glycols employed in the method of our invention is that they have at least one secondary hydroxyl radical. The dialkylene glycol employed by Dickey et al. was diethylene glycol which has no secondary hydroxyl radicals, but rather, has two primary hydroxyl radicals. The reason for the remarkably improved results when a dialkylene glycol having at least one secondary hydroxyl radical is employed in the reaction is not completely understood. Suffice to say at present that the improvement is one of tremendous importance since commercial operations can be based on the method of our invention since conversions and yields of about 70–85% are consistently obtained.

The method of our invention is one for preparing substituted morpholines which comprises vaporizing and heating a dialkylene glycol, having at least one secondary hydroxyl radical, together with hydrogen and an aminating agent which is ammonia or a primary amine and passing same over a hydrogenation/dehydrogenation catalyst. The reaction is carried out at elevated temperatures in vapor phase and usually at about atmospheric pressure. We have found that the method does not provide the high conversions and yields which are desired when the reaction is carried out under liquid phase conditions or when the feed mixture does not include hydrogen.

The dialkylene glycols employed in the method of the invention correspond to the general formulas shown below:

(A) 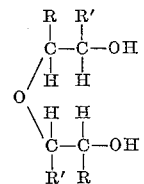

and (B) 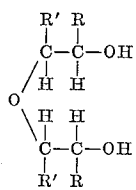

wherein R is an organic radical such as an alkyl, alkenyl, alkoxymethyl, aryl, or aryloxymethyl radical, and wherein R' is hydrogen or an organic radical as set forth for R above. R and R' can also collectively constitute a tetramethylene radical. Mixtures of such dialkylene glycols can also be used. Thus, it will be noted that only in the case where R' is attached to the carbon atom carrying the hydroxyl radical and said R' is hydrogen is the hydroxyl radical a primary hyrdoxyl radical. In all other cases, i.e., when R' is not attached to the carbon atom carrying the hydroxyl radical or when R' is an organic radical as defined for R, the hydroxyl radical is a secondary hydroxyl radical. Thus, Formula A represents a dialkylene glycol which can have one primary hydroxyl radical and one secondary hydroxyl radical, and Formula B represents a dialkylene glycol having two secondary hydroxyl radicals. When both R and R' are organic radicals, Formulas A and B represent dialkylene glycols having a pair of secondary hydroxyl radicals.

The essential and characteristic features of the dialkylene glycols employed in the invention then are (1) the hydroxyl radicals must be connected to the ether oxygen atom by exactly two carbon atoms, and (2) at least one of said carbon atoms connecting an hydroxyl radical to the ether oxygen atom is substituted with an organic radical as described, i.e., at least one of the hydroxyl radicals is a secondary hydroxyl radical.

It will be apparent that dipropylene glycol is the lowest molecular weight dialkylene glycol having these essential and characteristic features, but it will be appreciated that the invention is not restricted to the use of dipropylene glycol as the reactant in the process. For example, with ammonia as the aminating agent, methylethylmorpholines are obtained when the dialkylene glycol reactant used is the reaction product of butylene oxide with propylene glycol, 1-(2-hydroxypropoxy)-2-butanol. Similarly, trimethylmorpholines are obtained when the dialkylene glycol reactant used is the reaction product of propylene oxide with 2,3-butylene gylcol, 2-(2-hydroxypropoxy)-3-butanol. Furthermore, alkylaryl-substituted morpholines are obtained when the dialkylene glycol employed is the reaction product of styrene oxide with propylene glycol. The resulting morpholine is 2-methyl-5-phenylmorpholine. Alkyloxymethyl- or aryloxymethyl-substituted morpholines are obtained in accordance with this invention when the dialkylene glycol employed as the reactant is the reaction product of an alkylglycidol ether with propylene glycol. Furthermore, it may be noted that commercially available dipropylene glycol is made by acid catalysis and is actually a mixture of isomers of diprophylene glycol containing about 20 weight percent dipropylene glycol having two secondary hydroxyl radicals and about 80 weight percent dipropylene gylcol having one primary and one secondary hydroxyl radical. Thus, the product of the reaction, when commercial dipropylene glycol is used, is a mixture of dimethylmorpholines, specifically, a mixture of 3,5-dimethylmorpholine and 2,5-dimethylmorpholine. Dipropylene glycol can also be made on a commercial scale by base catalysis in which case the glycol is predominantly one having two secondary hydroxyl radicals and, when employed in the process of our invention, provides a mixture of dimethylmorpholines which is predominantly 3,5-dimethylmorpholine.

Specific working examples of dialkylene glycols corresponding to the above formulas, which when used in the process of this invention provide substituted morpholines, are set forth below.

Examples of dialkylene glycols corresponding to formula A above wherein R is an alkyl radical having not more than 6 carbon atoms and R' is hydrogen are 2-(2-hydroxypropoxy) - 1 - propanol, 2-(2-hydroxybutoxy)-1-butanol, 2-(2-hydroxybutoxy)-1-propanol, 2-(2-hydroxypentoxy)-1-pentanol, 2-(2-hydroxypentoxy)-1-butanol, 2-(2-hydroxyhexoxy)-1-hexanol, 2-(2-hydroxyhexoxy)-1-heptanol, 2-(2-hydroxyoctoxy)-1-octanol, 2-(2-hydroxyheptoxy)-1-pentanol, 2-(2-hydroxyoctoxy)-1-hexanol, and the like.

Examples of dialkylene glycols corresponding to Formula B above wherein R is an alkyl radical having not more than 6 carbon atoms and R' is hydrogen are 1,1'-oxydi-2-propanol, 1,1'-oxydi-2-butanol, 1-(2-hydroxybutoxy)-2-propanol, 1,1'-oxydi-2-pentanol, 1-(2-hydroxypentoxy)-2-butanol, 1,1'-oxydi-2-hexanol, 1,1'-oxydi-2-heptanol, 1,1'-oxydi-2-octanol, 1-(2-hydroxyheptoxy)-2-pentanol, 1-(2-hydroxyoctoxy)-2-hexanol, and the like.

Examples of dialkylene glycols corresponding to Formula A above wherein R is an alkenyl radical having not more than 6 carbon atoms and R' is hydrogen are 2-(2-hydroxy-5-hexenoxy) - 3 - buten-1-ol, 2-(2-hydroxy-7-octenoxy)-4-penten-1-ol, 2-(2-hydroxy-7-octenoxy)-7-octen-1-ol, and the like.

Examples of dialkylene glycols corresponding to Formula B above wherein R is an alkenyl radical having not more than 6 carbon atoms and R' is hydrogen are 1,1'-oxydi-3-buten-2-ol, 1,1'-oxydi-5-hexen-2-ol, 1,1'-oxydi-7-octen-2-ol, and the like.

Examples of dialkylene glycols corresponding to Formula A above wherein R is an alkoxymethyl radical having not more than 6 carbon atoms and R' is hydrogen are 2-(2-hydroxy-3-ethoxypropoxy)-3-ethoxy-1-propanol, 2-(2-hydroxy-3-propoxypropoxy) - 3-propoxy-1-propanol, 2-(2-hydroxy - 3 - pentoxypropoxy)-3-ethoxy-1-propanol, and the like.

Examples of dialkylene glycols corresponding to Formula B above wherein R is an alkoxymethyl radical having not more than 6 carbon atoms and R' is hydrogen are 1,1'-oxybis-3-ethoxy - 2 - propanol, 1,1'-oxybis-3-propoxy-2-propanol, 1,1'-oxybis-3-pentoxy-2-propanol, and the like.

Examples of dialkylene glycols corresponding to Formula A above wherein R is an aryl radical or a substituted aryl radical, preferably alkyl-substituted, having not more than 4 carbon atoms of substitution and R' is hydrogen are 2-(2-hydroxy-2-phenylethoxy) - 2 - phenylethanol, 2-[2-hydroxy - 2 - (4-methylphenyl) - ethoxy]-2-(3-ethylphenyl)-ethanol, 2 - [2-hydroxy-2-(4-butylphenyl)-ethoxy]-2-naphthyl-ethanol, and the like.

Examples of dialkylene glycols corresponding to Formula B above wherein R is an aryl radical or a substituted aryl radical, preferably alkyl-substituted, having not more than 4 carbon atoms of substitution are 2-(2-hydroxy - 2' - naphthyethoxy) - 1 - phenylethanol, 2,2'-oxybis-1-phenylethanol, 2-[2-hydroxy-2-(2-propylphenyl)-ethoxy]-1-(2,4-dimethylphenyl)-ethanol, and the like.

An example of a dialkylene glycol corresponding to Formula A above wherein R is an aryloxymethyl radical and R' is hydrogen is 2-(2-hydroxy-3-phenoxy-propoxy)-3-phenoxy-1-propanol.

An example of a dialkylene glycol corresponding to Formula B above wherein R is an aryloxymethyl radical and R' is hydrogen is 1,1'-oxybis-3-phenoxy-2-propanol.

Examples of dialkylene glycols corresponding to Formulae A and B above wherein more than one kind of said substituents for R and R' are present in the same molecule are 2-(2-hydroxy-2-phenylethoxy)-1-propanol, 2-(2-hydroxy - 5 - hexenoxy)-1-butanol, 1-(2-hydroxy-3-methoxypropoxy)-2-butanol, 2 - (2-hydroxy-5-hexenoxy)-1-octanol, and the like.

A dialkylene glycol, having the essential features as set forth hereinabove, is reacted with an aminating agent which can be ammonia or a primary amine in accordance with the invention. Ammonia is highly preferred as the aminating agent because we have found that unusually good yields and conversions are obtainable therewith. However, primary amines are generally applicable in the process of the invention, also, and representative of such primary alkyl amines having up to about 18 carbon atoms which can be used are methylamine, ethylamine, octylamine, octadecenylamine, cyclohexylamine, and the like.

The catalyst used in accordance with the invention is any hydrogenation/dehydrogenation catalyst containing, for example, nickel, cobalt, iron, vanadium, molybdenum, palladium, platinum, copper, copper chromite, copper nickel chromite, and the like. The preferred catalyst is a nickel or cobalt hydrogenation/dehydrogenation catalyst, such as nickel or cobalt deposited on a siliceous support, and a specific nickel catalyst which has been found to give excellent results is a catalyst which is sold under the code name, "Ni 0104," by Harshaw Chemical Company, Cleveland, Ohio. Harshaw catalyst Ni 0104 is a supported nickel catalyst containing about 60% of nickel. After the nickel is completley reduced in the preparation of the catalyst, it is partially re-oxidized to stabilize the catalyst and reduce its pyrophoric characteristics.

Cobalt hydrogenation/dehydrogenation catalysts also provide high conversions and yields in the process of our invention. Supported cobalt and supported nickel catalysts are commonly prepared by suspending a finely divided inert catalyst support in an aqueous solution of a salt of the nickel or cobalt. Sodium carbonate is then added to produce an insoluble nickel or cobalt carbonate. The resulting slurry is then filtered, washed with water and dried. The powdered mixture of carbonate and catalyst support is dried, mixed with a lubricant and a binder, and pressed into pellets or other desired physical form. For an excellent review of the preparation of nickel or cobalt catalysts or other hydrogenation/dehydrogenation catalysts that can be used in the method of the invetnion, see "Catalysis" by Berkman et al., pp. 253–265, Reinhold Publishing Company, 330 W. 42nd Street, New York, New York (1940 Edition).

The process of our invention is employed in a continuous system and is carried out in the vapor phase.

The reaction of this invention is carried out in the presence of hydrogen gas and the dialkylene glycol reactant used can be anhydrous or the reaction can be carried out in the presence of added water. In carrying out our reaction in a continuous system, we have found that the presence of water is particularly beneficial during the initial stages of the run when the catalyst is in a highly active state. We have found that 10 to 15 parts by weight of water per 100 parts by weight of the dialkylene glycol gives excellent results although good results have been obtained with anhydrous dialkylene glycol as the feed. Larger amounts of water also can be used with good results, but economic considerations make it undesirable to use more than about 25 parts by weight of water based on 100 parts by weight of the dialkylene glycol.

We have found that the presence of hydrogen is essential for obtaining the high conversions and yields of substituted morpholines produced by the process of the invention.

The relative amounts of reactants employed in our process can be varied over a wide range. The amount of the aminating agent, ammonia or primary amine, has no upper limit except that which is dictated by economic considerations. Thus, a large excess of the aminating agent can be used which can be separated from the reaction product and recycled to the reaction zone. In general, at least 2 mols of aminating agent is used for each mol of dialkylene glycol in the feed, and the amount of hydrogen should be equal to at least about one-fifth the total amount of the gases in the feed. Thus, at least 1 mol of hydrogen is present in the feed per mol of dialkylene glycol and higher conversions and yields are obtained when at least about 2.5 to 3 mols of hydrogen per mol of dialkylene glycol is used. The molar ratio of these reactants used in the process of our invention is, typically, about 1 mole of dipropylene glycol to 1 mol water to 5 mols ammonia to 3 mols hydrogen.

Similarly, the amount of total feed per unit of catalyst per hour can be varied over a wide range. The smaller the amount of feed per unit of catalyst per hour, the higher the conversion that is obtained under a given set of conditions of catalyst, temperature and pressure. We have obtained conversions and yields to dimethylmorpholine of about 85% when the total feed rate per unit of catalyst was from about 0.9 to 1.4 mols of total feed per 100 grams of nickel catalyst per hour. In general, the total feed is passed over a hydrogenation/dehydrogenation catalyst at up to about 10 mols per 100 grams of catalyst per hour, although the highest conversions and yields to substituted morpholines with hydrogenation/dehydrogenation catalysts of average activity are obtained at up to about 2.5 mols of total feed per 100 grams of catalyst per hour.

The process of the invention can be carried out over a range of temperatures. The actual temperature used in any particular case is determined by such variables as catalyst activity, catalyst concentration, reaction time, as well as the conversion and yield of substituted morpholines which are desired. Thus, lower temperatures can be used with catalysts of higher activity, and higher temperatures are desirable with catalysts of lower activity. In general, the temperature used in our method is in the range from 150 to 250° C. We have found that higher conversions and yields are obtained with nickel or cobalt catalysts at a temperature in the range of from 175 to 200° C. which is, therefore, preferred. Higher temperatures are, in general, desirable when copper or copper chromite catalysts are used. When Ni 0104 catalyst was used, the best results were obtained at a temperature in the range from 180 to 195° C.

The reaction of this invention is carried out conveniently at atmospheric pressure and the reactants are contacted in the vapor phase, although superatmospheric pressures can be used.

In certain of the runs which we have carried out to prepare substituted morpholines by the method of the invention, we have found that up to approximately 25% of the substituted morpholine reaction product is an unsaturated material which discolors upon standing and causes the formation of resin-like material upon heating, as in a fractional distillation of the reaction product. In certain other runs which we have made, there was no unsaturated material in the substituted morpholine product at all. The precise identity of the unsaturated material is not known, and the reason for its formation is not completely understood. However, the unsaturated material can be termed a precursor of the substituted morpholine product, since we have found, most unexpectedly, that the unsaturated material is readily and completely converted to the desired substituted morpholine product itself by hydrogenating the substituted morpholine product. Thus, a modification of our process includes the additional step of hydrogenating the reaction product of our process, thereby providing high conversions and yields of substituted morpholines completely free of unsaturated material.

As is demonstrated in certain of the examples to follow, we have found that the unsaturated material referred to above is most readily and completely reduced in the hydrogenation step, and excellent results were obtained when the total reaction product of our process was first fractionally distilled so as to provide a fraction having a preselected boiling range. For example, when the product fraction had a boiling range of about 80 to 200° C., the unsaturated material in the product was almost completely converted to the desired substituted morpholine product by hydrogenation thereof, and when the product fraction had a boiling range of about 140 to 150° C., the unsaturated material was completely converted to the desired substituted morpholine product.

The step of hydrogenating the reaction product of our process can be carried out under hydrogenation conditions, continuously or as a batch process, in the presence of any of the well-known hydrogenation catalysts. We have found Raney nickel to be well suited for this purpose, and excellent results were obtained when the hydrogenation step was carried out at a pressure of from 400 to 1200 p.s.i.g. and a temperature of from 150 to 200° C. The amount of Raney nickel which we have used was from about 1.4 to about 3.0 grams per 100 grams of unsaturated substituted morpholine precursor. Other well-known hydrogenation catalysts can be used, such as cobalt, platinum, palladium, copper chromite, and the like.

The terms "yield" and "conversion" as used in this specification are defined herein as follows. Conversion is a measure of the percent of the charged dialkylene glycol reactant that is converted to the product of interest, that is, a substituted morpholine, and conversion is calculated in accordance with the equation:

Percent Conversion
$$= \frac{\text{(mols products obtained)}}{\text{mols dialkylene glycol charged}} \times 100$$

Yield is calculated on the basis of the dialkylene glycol reactant actually consumed in the reaction in accordance with the equation:

Percent Yield
$$= \frac{\text{(mols product obtained)}}{\text{(mols dialkylene glycol charged)} - \text{(mols dialkylene glycol recovered)}} \times 100$$

The following examples are supplied to illustrate the process of this invention and should not be employed to unduly restrict the invention in view of the disclosure of reactants, catalysts and conditions which have been set forth herein.

EXAMPLE I

*Part A*

As has been discussed heretofore, commercial dipropylene glycol is a mixture of isomers. Approximately 80% is the isomer containing one secondary hydroxyl radical and one primary hydroxyl radical and about 20% is the isomer having two secondary hydroxyl radicals. When the isomer of dipropylene glycol having two secondary hydroxyl radicals is reacted in accordance with this invention, 3,5-dimethylmorpholine is the product. In order to prepare solely 3,5-dimethylmorpholine, a quantity of dipropylene glycol having only secondary hydroxyl radicals was prepared for use in the reaction of the invention, which isomer of dipropylene glycol is 1,1'-oxydi-2-propanol.

The method employed is in the preparaton of 1,1'-oxydi-2-propanol was the method disclosed by A. R. Sexton and E. C. Britton, "Synthesis and Identification of Dipropylene Glycol Isomers," Journal of the American Chemical Society, 75, pages 4357–4358. This method is based on reacting propylene oxide with propylene glycol in the presence of sodium or sodium hydroxide as a catalyst.

The crude 1,1'-oxydi-2-propanol product, prepared by the method of Sexton et al, was fractionally distilled at 40 millimeters of mercury pressure and a cut boiling at 141 to 142° C. at 40 millimeters of mercury pressure and weighing 1740 grams was recovered as the 1,1'-oxydi-2-propanol. This product was further purified by crystallization from diethyl ether as is described in the Sexton et al. article cited above. The crystallized product had a melting range of 38 to 44° C. In order to obtain a still purer grade of 1,1'-oxydi-2-propanol, the crystallized product was recrystallized from diethyl ether and a final product melting between 45.3 and 46.3° C. was obtained. Approximately 900 grams of the crystallized 1,1'-oxydi-2-propanol product having a melting range from 38 to 44° C. was employed in the reaction of this invention to produce 3,5-diemthylmorpholine as is set forth in Part B.

*Part B*

An aqueous solution of the 1,1'-oxydi-2-propanol, together with ammonia as the aminating agent and hydrogen was heated and passed continuously in vapor phase over a supported nickel hydrogenation/dehydrogenation catalyst.

The molar proportions of reactants used where 1 mol of the glycol to 1 mol of water to 3 mols of hydrogen to 5 mols of ammonia. Thus, the liquid feed contained equimolar amounts of 1,1'-oxydi-2-propanol and water, i.e., 88.2 weight percent 1,1'-oxydi-2-propanol and 11.8 weight percent water. The reactor was charged with 320 cubic centimeters (449 grams) of the nickel catalyst, Ni 0104, and the reaction was carried out at a temperature of 190–195° C.

The reactor employed was an electrically heated, one-inch steel tube core furnace having a 24-inch catalyst bed centrally located therein with ten inches of Raschig rings packed below the catalyst bed and 19 inches of Raschig rings packed above the catalyst bed. When starting up the run, a flow of hydrogen through the reactor at the proper rate for the reaction was established initially before applying heat to the reactor. Thereafter the reactor was heated to the desired temperature. A flow of ammonia was then introduced to the reactor and adjusted to the proper rate. Finally, the aqueous solution of 1,1'-oxydi-2-propanol with pumped into the reactor.

The 1,1'-oxydi-2-propanol feed was introduced to the reactor under the condition set forth above and the reaction carried out for nine and one-half hours. The crude product, which weighed 1026 grams, was worked up by fractional distillation.

The fractional distillation was carried out in a 120 x 2.8 cm. glass column packed with glass helices. First, ammonia and other low-boiling materials were removed from the crude reaction product by refluxing the crude reaction product and venting through a Dry-Ice condenser. The distillation column condenser was then changed to a water-cooled head and the distillation carried out until the head temperature of the column was about 85° C. At this point, 100 grams of benzene was added to the kettle of the column and a decanter was placed on top of the column for use in an azeotropic dehydration of the product. The distillation was then carried out with the aqueous layer being removed from the decanter with the head temperature at approximately 68 to 80° C. When the head temperature exceeded 80° C., the decanter was replaced with a regular water-cooled head condenser. The distillation of the product was then completed and a 524 gram dimethylmorpholine fraction was obtained boiling from 140 to 144° C. and having a neutral equivalent of from 114.9 to 115.9. No unreacted glycol was recovered, so the conversion and yield obtained in the reaction was 78% to dimethylmorpholine.

A sample of the dimethylmorpholine product fraction was redistilled to give a fraction boiling from 143 to 144° C. which was tested for the presence of unsaturated or reducible material by ultraviolet, infrared and polarographic methods. The results of these tests showed that the product of this run, as represented by the cut boiling from 143 to 144° C., contained only a trace amount of impurity and was essentially pure 3,5-dimethylmorpholine.

In order to further identify the product of this run as being 3,5-dimethylmorpholine, the phenylthiourea derivative of the redistilled product boiling from 143 to 144° C. was prepared and the density of the product was determined. The melting point of the phenylthiourea derivative was determined and the results obtained, i.e., melting point of the phenylthiourea derivative and density of the 3,5-dimethylmorpholine product, are set forth below in Table 1 for comparison with published data on these values. The phenylthiourea derivative was prepared by reacting the 3,5-dimethylmorpholine product with phenyl isothiocyanate.

TABLE 1

|  | 3,5-Dimethylmorpholine | |
|---|---|---|
|  | Prepared by B. and S.[1] | Example I, Part B |
| Density, $d_4^{16}$ | 0.9308 | 0.931 |
| Phenylthiourea derivative, melting point, °C | 122–123 | 125.5–125.7 |
| Boiling Point, °C | 142.5 | 143.144 |

[1] A. Ya Berlin and T. P. Sycheva, "C-Alkyl-Substituted Morpholines", C. A. 44, 7853 (1950).

*Part C*

Another run was carried out wherein the distilled but not crystallized 1,1'-oxydi-2-propanol prepared by the base catalyzed reaction between propylene oxide and propylene glycol, described in Part A above, was used as the dialkylene glycol reactant. The 1,1'-oxydi-2-propanol was reacted with ammonia in the presence of added hydrogen and water. The total feed, having a molar ratio of components of 1:1 to 5:3 of 1,1'-oxydi-2-propanol, water, ammonia and hydrogen, respectively, was passed over 419 grams (290 cc.) of Ni 0104 catalyst in a Dowtherm-heated one-inch tubular reactor at 190° C. at atmospheric pressure for 105 hours. The feed rate was a total of 6 mols of the feed per hour which amounted to 0.6 mol 1,1'-oxydi-2-propanol per hour, 0.6 mol water per hour, 1.8 mols hydrogen per hour, and 3.0 mols ammonia per hour. After a three-hour forerun which was required to line out the reaction conditions, three product samples were collected. Product sample No. 1 was collected for 23 hours, No. 2 for 72 hours, and No. 3 for 20 hours.

The product samples were fractionally distilled as described in Part B above. The product fraction in sample No. 1 boiled from 140–158° C., had a neutral equivalent of 115.5, and there was a conversion and yield of 82% to dimethylmorpholine during the portion of the run represented by this sample. The product fraction in sample No. 2 boiled from 140–148° C., had a neutral equivalent of 115.7, and there was a conversion and yield of 85% to dimethylmorpholine during the portion of the run represented by this sample. The product fraction in sample No. 3 boiled from 140–148° C., had a neutral equivalent of 115.1, and there was a conversion and yield of 85% during the portion of the run represented by this sample.

As has been described above, the commercial grade of dipropylene glycol contains about 80 weight percent of the isomer having one primary hydroxyl radical and one secondary hydroxyl radical. Reaction of this isomer in accordance with this invention produces 2,5-dimethylmorpholine. In order to carry out this reaction, the necessary starting material, 2-(2-hydroxypropoxy)-1-propanol was synthesized for use as the feed in the reaction according to the method of Sexton et al., cited above. Thus, 1-methoxy-2-propanol was reacted with propylene oxide using sodium as the catalyst to give 1-(2-methoxy-isopropoxy)-2-propanol which was heated with hydrobromic acid to give methyl bromide and the desired 2-(2 - hydroxypropoxy) - 1 - propanol. The 2-(2-hydroxypropoxy)-1-propanol had a boiling point of 226–227° C. at 760 millimeters pressure, refractive index of 1.4398 at 25° C., and a specific gravity of about 1.013.

EXAMPLE II

The 2-(2-hydroxypropoxy)-1-propanol was reacted in the process of this invention to prepare 2,5-dimethylmorpholine. The reactor and catalyst used was that used in Example I. The liquid feed employed was a mixture of 88.2 weight percent of 2-(2-hydroxypropoxy)-1-propanol and 11.8 weight percent water. The molar proportions of aqueous glycol feed, hydrogen and ammonia employed were 1 mol of 2-(2-hydroxypropoxy)-1-propanol to 1 mol of water to 3 mols of hydrogen to 5 mols of ammonia. The reaction was carried out in the reactor and following the procedure of Example 1 for 11 hours at a temperature of 190–195° C. The crude product, which weighed 1136 grams, was fractionally distilled as described in Example I. The product fraction weighed 559 grams, boiled from 140–149° C., and, based on its neutral equivalent of 115.2, was 100% dimethylmorpholine. Since no unreacted glycol was recovered in the distillation of the product, there was a conversion and yield of 74% to 2,5-dimethylmorpholine.

The result of this run is of particular interest because it clearly demonstrates that a dialkylene glycol having only a single secondary hydroxyl radical can be reacted in the process of this invention and high conversions and yields to the desired substituted morpholine are obtained. It is again pointed out that the reaction of diethylene glycol, which has two primary hydroxyl radicals, produces low conversions and yields when treated in a similar fashion.

A sample of the product 2,5-dimethylmorpholine was fractionally distilled to give a fraction boiling from 145–146° C. which was tested for the presence of unsaturated or reducible material by ultraviolet, infrared and polarographic methods. The results of these tests showed that the product was free of such unsaturated materials and was essentially pure 2,5-dimethylmorpholine.

The density of the 145–146° C. fraction of the product 2,5-dimethylmorpholine was determined and the phenylthiourea derivative of same was prepared in the manner set forth in Example I. The melting point of this derivative and the density of the product are set forth, along with published data on these values, in Table 2, below.

TABLE 2

|  | 2,5-Dimethylmorpholine | |
|---|---|---|
|  | Prepared by B. and S.[1] | Example II |
| Density, $d_4^{15}$ | 0.9362 | 0.936 |
| Phenylthiourea Derivative, melting point, °C | 145–147 | 146–147.3 |
| Boiling Point, °C | 145 | 145–146 |

[1] A. Ya Berlin and T. P. Sycheva, "C-Alkyl-Substituted Morpholines", C. A. 44, 7853 (1950).

EXAMPLE III 3-methyl-5-ethylmorpholine was prepared by the method of this invention by using 1-(2-hydroxypropoxy)-2-butanol as the starting material dialkylene glycol. The 1-(2-hydroxypropoxy)-2-butanol was prepared according to the method of Sexton et al, cited above, by reacting 1,2-butylene oxide with propylene glycol in the presence of sodium as a catalyst. The crude dialkylene glycol product obtained was distilled and 1-(2-hydroxypropoxy)-2- butanol was produced which boiled at 120–121° C. at 10 mm. Hg.

The 1-(2-hydroxypropoxy)-2-butanol was reacted in the process of this invention to prepare 3-ethyl-5-methylmorpholine. The reactor system and the catalyst used was that described in Example I. The liquid feed employed consisted of a mixture of 89.2 weight percent of the glycol and 10.8 weight percent of water. This feed mixture together with hydrogen and ammonia was passed over the catalyst at a rate of 0.6 mol glycol, 0.6 mol water, 1.8 mols hydrogen and 3 mols ammonia per hour at a temperature of 190° C. The mol ratio of the reactants was 1:1:3:5 of 1-(2-hydroxypropoxy)-2-butanol to water to hydrogen to ammonia, respectively. The reaction was carried out for a period of 24 hours following the procedure of Example I.

The crude product from the reaction was fractionally distilled as described in Example I, and a product fraction weighing 1464 grams, boiling from 162–168° C. was 99% ethylmethylmorpholine, based on its neutral equivalent of 130.7. Since there was no unreacted glycol recovered, there was a 77% conversion and yield to 3-ethyl-5-methylmorpholine, based on the 1-(2-hydroxypropoxy)-2-butanol.

A sample of the ethylmethylmorpholine product fraction was tested for the presence of unsaturated or reducible material by ultraviolet, infrared and polarographic methods. As will be noted in Table 3, below, this product contained only a small amount of unsaturated material. The results of the infrared analysis was that a spectrogram generally characteristic of a morpholine and similar to that obtained from 3,5-dimethylmorpholine was obtained.

equivalent of 128.6 and, upon being subjected to polarographic analysis, showed no signs of unsaturated or reducible material. The hydrogenated product was water white and clear.

EXAMPLE IV 2,3,5-trimethylmorpholine was prepared by the method of this invention by employing 2-(2-hydroxypropoxy)-3-butanol as the dialkylene glycol. The 2-(2-hydroxypropoxy)-3-butanol was prepared by the method of Sexton et al., cited above, by reacting 2,3-butylene glycol with propylene oxide in the presence of metallic sodium as the catalyst. The 2-(2-hydroxypropoxy)-3-butanol product boiled at 116–122° C. at 10 millimeters mercury pressure.

In preparing the trimethylmorpholine by the method of the invention, the feed mixture employed was an aqueous solution of 2-(2-hydroxypropoxy)-3-butanol, hydrogen and ammonia in the mol ratio of 1 mol 2-(2-hydroxypropoxy)-3-butanol to 1 mol water to 3 mols hydrogen to 5 mols ammonia. The feed mixture was passed over the same catalyst employed in Example III which was 449 grams of Ni 0104 catalyst at a temperature of 190° C. for 18 hours. The liquid feed contained 89.2 weight percent of the glycol and 10.8% water. 2026 grams of the crude product was obtained and was fractionally distilled in the manner described in Example I. Two product fractions were obtained, product fraction No. 1 boiling from 151–160° C. and weighing 705 grams was 99% trimethylmorpholine based on its neutral equivalent of 130.1, and product fraction No. 2 boiling from 160–165° C. and weighing 274 grams was 99% trimethylmorpholine based on its neutral equivalent of 130.4. Since there was no unreacted glycol recovered, there was a 63% conversion and yield to 2,3,5-trimethylmorpholine based on the 2-(2-hydroxypropoxy)-3-butanol.

TABLE 3

| Sample | Ultraviolet Results, 0.01 M Soln., Absorbency at 250 and 330 millimicrons | | Infrared Results | Polarograph Results, 0.01 M Soln., Wave Height in Microamps at Half Wave Potentials, Approximate | |
|---|---|---|---|---|---|
| | 250 mu | 330 mu | | 1.5 V | 1.75 V |
| Example III, ethylmethylmorpholine. | Some absorbency. | | (See comments above.) | 2.5 | 0.7 |

The unsaturated or reducible material noted in the ethylmethylmorpholine product was completely converted to ethylmethylmorpholine by subjecting a sample of the product to hydrogenation conditions. 1413 grams of the ethylmethylmorpholine product and 30 grams of Raney nickel catalyst were charged into a one gallon stainless steel autoclave. Hydrogen gas was added to the autoclave in order to establish a pressure of 50 p.s.i.g. and the contents of the autoclave were then heated to 200° C. Additional hydrogen was then added to bring the pressure to 1200 p.s.i.g. and the hydrogenation reaction appeared to be complete in one hour. After filtering the catalyst from the hydrogenated product, the filtrate was fractionally distilled in a 2.8 x 120 centimeter glass distillation column packed with glass helices. A cut boiling from 163–165° C. which weighed 1278 grams had a neutral The two product fractions were tested for the presence of unsaturated or reducible materials by ultraviolet, infrared and polarographic methods. The infrared analysis of these two samples indicated that the major component of both cuts is the same material, that the spectra are very much like that of dimethylmorpholines and that there was some evidence of contamination in these cuts indicated by absorptions at 6.0 and 9.0 microns. The analysis by ultraviolet and polarographic methods is reported below in Table 4 which indicates the presence of some reducible or unsaturated material in the product.

TABLE 4

| Sample | Ultraviolet Results, 0.0089 M Soln., Absorbency at 250 and 315 millimicrons | | Infrared Results | Polarograph Results, 0.0089 M Soln., Wave Height in Microamps at Half Wave Potentials, Approximate | |
|---|---|---|---|---|---|
| | 250 mu | 315 mu | | 1.5 V | 1.75 V |
| Example IV, Trimethylmorpholine Fraction No. 1. | 1.47 | 1.08 | (See comments above.) | 16.4 | 2.1 |
| Example IV, Trimethylmorpholine Fraction No. 2. | 0.750 | | (See comments above.) | 8.9 | 1.9 |

Samples of the trimethylmorpholine fractions No. 1 and No. 2 were combined and hydrogenated in order to convert the unsaturated or reducible material revealed to be present by the ultraviolet and polarographic analysis to the desired trimethylmorpholine product. A total of 893 grams of the product fractions were hydrogenated in the one-gallon, electrically heated stainless steel autoclave in the presence of 30 grams of wet Raney nickel catalyst. The autoclave was pressured to 50 p.s.i.g. with hydrogen and the contents heated to 200° C. Additional hydrogen was added to bring the total pressure of the system to 1200 p.s.i.g. and the hydrogenation reaction was virtually complete in 45 minutes. The hydrogenated product was filtered and fractionally distilled which provided a cut boiling at 153–160° C. having a neutral equivalent of 128.4, and a cut boiling at 160–164° C. having a neutral equivalent of 129.6, which cuts upon polarographic analysis were found to be completely free of any unsaturated or reducible material.

EXAMPLE V

N-ethyldimethylmorpholine was prepared by the method of the invention by employing monoethylamine as the aminating agent with commercial dipropylene glycol as the dialkylene glycol. The run was carried out continuously in vapor phase at atmospheric pressure using the reactor and procedure of Example I. The reactor was charged with 449 grams (310 cc.) of Ni 0104 catalyst and the reaction was carried out at 190° C. An aqueous solution of the starting materials was used as the feed which consisted of 0.6 mol dipropylene glycol, 1.8 mols monoethylamine, 1.9 mols water, and 1.8 mols hydrogen. The run was carried out for about 13.5 hours. The crude reaction product weighed 2389 grams and was fractionally distilled as described in Example I.

Two substituted morpholine products were obtained. The N-ethyldimethylmorpholine fraction weighed 272 grams and was collected at a boiling point of from 159–170° C., at which time the pressure on the distillation column was reduced to 200 mm. Hg, and at this pressure, at a boiling point of 61–74° C. Based on its neutral equivalent, the fraction obtained was 99% N-ethyldimethylmorpholine.

Dimethylmorpholine was also produced. The dimethylmorpholine fraction weighed 457 grams and was collected at a boiling point from 135–150° C. Based on its neutral equivalent, the fraction was 95% dimethylmorpholine.

Since there was no unreacted dipropylene glycol recovered in the distillation of the product, there was a total conversion and yield of 74% to substituted morpholines produced in this run, specifically, a 25% conversion and yield to N-ethyldimethylmorpholine and a 49% conversion and yield to dimethylmorpholine.

The dimethylmorpholine can be produced in this reaction by two possible routes. Ethylamine can react to form diethylamine, triethylamine and ammonia, with the ammonia reacting with the dipropylene glycol to give dimethylmorpholine, or the ethylamine can react with the dipropylene glycol, initially, to form N-ethyldimethylmorpholine, which being a tertiary amine, reacts with ethylamine to form diethylamine and dimethylmorpholine. It is not known how the reaction proceeded, but in any event, the result was a high conversion and yield to substituted morpholines, which is an objective of this invention.

EXAMPLE VI

An attempt was made to react an aqueous solution of diethylene glycol with ammonia using the procedure, catalyst and reactor described in Example I. This is the run briefly referred to in the first part of this specification. The reactor was charged with 449 grams of Ni 0104 catalyst (320 cubic centimeters). The feed employed in the reaction was 74.4 grams (68 milliliters) per hour of a mixture of diethylene glycol and water which contained 0.6 mols of diethylene glycol and 0.6 mols of water, 3.0 mols of ammonia (51 grams) per hour and 1.8 mols hydrogen (44 liters at 25° C.) per hour. Thus, there was a total of 6.0 mols of feed introduced to the reactor per hour, including water.

1267 grams of the aqueous diethylene glycol were passed over the catalyst in 17 hours. The total product, weighing 1299 grams, was fractionally distilled in the manner described in Example I. After collecting Cut No. 1, 70 grams of methanol was added to the kettle of the column and the decanter was replaced with a regular distillation column condenser head. The distillation of the product is summarized below in Table 5 and provided the following cuts having the indicated boiling ranges, weight, and composition:

TABLE 5

| Cut No. | Boiling Range, °C. | Weight, Grams | Neutral Equivalent | Composition |
|---|---|---|---|---|
| 1 | 67–79 | 376 | | Aqueous layer from decanter. |
| 2 | 57–75 | 164 | | Methanol-benzene azeotrope. |
| 3 | 75–125 | 15 | 100.2 | (Intermediate.) |
| 4 | 125–138 | 96 | 98.2 | 88.5% as morpholine. |
| 5 | Up to 160 [1] | 56 | 216.4 | (Intermediate.) |
| 6 | 132–135 [2] | 395 | 2,057.4 | Diethylene glycol. |
| Residue | | 193 | | |

[1] 50 mm. Hg pressure.
[2] 15 mm. Hg pressure.

Based on the foregoing results, there was obtained in the amination of diethylene glycol a 9.6% conversion to morpholine based on diethylene glycol. This conversion is calculated considering only Cut No. 4 in the distillation of the product as containing morpholine. Based on the weight of Cut No. 6 as unreacted diethylene glycol, there was obtained a yield of 15.1 weight percent to morpholine based on diethylene glycol. These results, a 9.6% conversion and a 15.1% yield to morpholine, obtained when diethylene glycol was used as the feed to the reaction otherwise carried out under the conditions in the process of the invention, are substantial proof of the remarkable and unexpected improvement in conversion and yield one obtains when aminating a dialkylene glycol defined herein as within the scope of the invention, since, in the method of the invention, conversions and yields of up to 85% can be consistently obtained.

EXAMPLE VII

A sustained run was carried out to prepare dimethylmorpholine by the reaction of commercial dipropylene glycol with ammonia in the presence of hydrogen and a nickel hydrogenation/dehydrogenation catalyst. The run was carried out continuously for 698 hours. An over-all conversion to dimethylmorpholine of 65% and a yield of 79 weight percent was obtained, based on dipropylene glycol.

The catalyst employed was the nickel catalyst, Ni 0104 described hereinbefore. 449 grams of Ni 0104 catalyst (320 cc.) were used. The dipropylene glycol feed used at the start of the run was an aqueous solution of dipropylene glycol which consisted of equimolar quantities of water and dipropylene glycol. The dipropylene glycol feed thus consisted of 88.2 weight percent dipropylene glycol and 11.8 weight percent water. The reactants employed in the run were maintained in a molar ratio of 1 mol dipropylene glycol feed to 5 mols ammonia to 3 mols hydrogen. This mol ratio of reactants amounts to 0.6 mol of dipropylene glycol and 0.6 mol of water per hour (a total of 91.2 grams or 89 milliliters of the aqueous dipropylene glycol feed per hour), 3.0 mols ammonia per hour (51 grams per hour) and 1.8 mols hydrogen per hour (43 liters at 25° C.). Thus, a total of 6.0 mols of reactants, including the 0.6 mol of water, were passed through the reactor per hour.

The total crude product from the reactor was fractionally distilled in the manner described in Example I. The dimethylmorpholine product was obtained at a column head temperature from 140–150° C. and an unreacted dipropylene glycol fraction was obtained at a temperature from 107–134° C. at about 17 millimeters pressure.

*Part A*

The results of the first 368 hours of this run are summarized below in Table 6:

TABLE 6

| Total Hours on Stream | Weight of Dipropylene Glycol and Water Feed, Grams | Weight of Total Product Recovered, Grams | Conversion to Dimethylmorpholine ($C_6H_{13}ON$) Based on Dipropylene Glycol ($C_6H_{14}O_3$), Percent | Yield to Dimethylmorpholine ($C_6H_{13}ON$) Based on Dipropylene Glycol ($C_6H_{14}O_3$), Percent |
|---|---|---|---|---|
| 12.5 | 1,141 | 1,232 | 76 | 76 |
| 36.5 | 2,239 | 2,421 | 67 | 79 |
| 61.5 | 2,219 | 2,427 | 68 | 76 |
| 84.5 | 2,216 | 2,417 | 70 | 77 |
| 108.5 | 2,214 | 2,425 | 70 | 79 |
| 132.5 | 2,211 | 2,412 | 70 | 78 |
| 156.5 | 2,212 | 2,401 | 69 | 79 |
| 180.5 | 2,180 | 2,380 | 73 | 82 |
| 204.5 | 2,216 | 2,403 | 69 | 81 |
| 228.5 | 2,174 | 2,374 | 68 | 78 |
| 252.5 | 2,195 | 2,389 | 67 | 81 |
| 276.5 | 2,204 | 2,400 | 65 | 88 |
| 300.5 | 2,208 | 2,395 | 64 | 78 |
| 319.0 | 2,070 | 2,191 | 63 | 75 |
| 344.0 | 2,194 | 2,360 | 66 | 78 |
| 368.0 | 2,186 | 2,370 | 66 | 80 |

*Part B*

After 368 hours of operation as described above in Part A, the unreacted dipropylene glycol recovered in the fractional distillation of the product, being that which boiled between 107 and 134° C. at about 17 millimeters pressure, was blended with the fresh dipropylene glycol-water feed to demonstrate that the recovered dipropylene glycol can be successfully recycled through the reaction zone. In this example, the run was continued using an aqueous solution of dipropylene glycol containing 88.2% dipropylene glycol and 11.8% water. Fifteen weight percent of the dipropylene glycol employed in the feed for the run was the recovered dipropylene glycol from fractional distillation of the reaction product. The run was continued with the new feed through 469 hours of continuous operation and results thereof are summarized below in Table 7:

TABLE 7

| Total Hours on Stream | Weight of Dipropylene Glycol and Water Feed, 15 Weight Percent of Dipropylene Glycol being Recycle Material, Grams | Weight of Total Product Recovered, Grams | Conversion to Dimethylmorpholine ($C_6H_{13}ON$) Based on Dipropylene Glycol ($C_6H_{14}O_3$), Percent | Yield to Dimethylmorpholine ($C_6H_{13}ON$) Based on Dipropylene Glycol ($C_6H_{14}O_3$), Percent |
|---|---|---|---|---|
| 379 | 1,023 | 1,083 | 63 | 72 |
| 389 | 922 | 1,007 | 67 | 80 |
| 413 | 2,201 | 2,379 | 63 | 75 |
| 437 | 2,199 | 2,381 | 63 | 78 |
| 461 | 2,202 | 2,368 | 63 | 77 |
| 469 | 738 | 797 | 63 | 77 |

*Part C*

After 469 hours of continuous operation with the last approximately 100 hours being carried out with unreacted dipropylene glycol recovered from the product being blended with the feed as shown in Part B, the dipropylene glycol feed employed was changed to 100% dipropylene glycol recovered by distillation of the product and water. The proportion of the recovered dipropylene glycol employed was 88.2 weight percent and the proportion of water employed was 11.8 weight percent, the same proportions as were used heretofore with fresh dipropylene glycol. The run was continued through 533 hours of continuous operation with the recovered dipropyleneglycol feed and the results of this phase of the operation are summarized below in Table 8:

TABLE 8

| Total Hours on Stream | Weight of Recovered Dipropylene Glycol and Water Feed, Grams | Weight of Total Product Recovered, Grams | Conversion to Dimethylmorpholine ($C_6H_{13}ON$) Based on Dipropylene Glycol ($C_6H_{14}O_3$), Percent | Yield to Dimethylmorpholine ($C_6H_{13}ON$) Based on Dipropylene Glycol ($C_6H_{14}O_3$), Percent |
|---|---|---|---|---|
| 485 | 1,446 | 1,541 | 66 | 81 |
| 509 | 2,175 | 2,322 | 66 | 81 |
| 533 | 2,290 | 2,427 | 65 | 80 |

*Part D*

After 556 hours of continuous operation, the feed to the reactor was changed to employ dry dipropylene glycol. The dipropylene glycol employed was fresh material described hereinabove as the commercial dipropylene glycol and contained only that amount of water present as impurity. No water was added to the feed. The run was continued through 698 hours of continuous operation at which time the run was ended. The results of this phase of the run wherein dry, fresh dipropylene glycol was used as the feed are summarized below in Table 9:

TABLE 9

| Total Hours on Stream | Weight of Dry Dipropylene Glycol Feed, Grams | Weight of Total Product Recovered, Grams | Conversion to Dimethylmorpholine ($C_6H_{13}ON$) Based on Dipropylene Glycol ($C_6H_{14}O_3$), Percent | Yield to Dimethylmorpholine ($C_6H_{13}ON$) Based on Dipropylene Glycol ($C_6H_{14}O_3$), Percent |
|---|---|---|---|---|
| 578 | 1,756 | 1,934 | 62 | 81 |
| 602 | 1,952 | 2,102 | 60 | 80 |
| 626 | 1,914 | 2,101 | 58 | 81 |
| 650 | 1,906 | 2,101 | 58 | 81 |
| 674 | 1,906 | 2,094 | 58 | 76 |
| 698 | 1,907 | 2,115 | 63 | 83 |

The fact that unreacted dipropylene glycol is recoverable from the reaction product easily by fractional distillation and can be recycled to the reactor makes the present method extremely attractive from a commercial viewpoint. The fact, further, that the reaction proceeds when the dipropylene glycol contains water or is dry is another advantage since the presence of water is unavoidable in this process. It is believed that it is desirable to employ an aqueous solution of dipropylene glycol when the reaction is started since the activity of the hydrogenation/dehydrogenation catalyst is believed to be enhanced when water is present at the beginning. However, the reaction will proceed when a dry dipropylene glycol feed is employed throughout.

EXAMPLE VIII

A series of runs was made for preparing dimethylmorpholine by the reaction of commercial dipropylene glycol with ammonia in the presence of hydrogen and a nickel catalyst under varying conditions of temperature, amount of reactants and ratio of amount of reactants to amount of catalyst.

The catalyst employed was Ni 0104 and the reactor system was that employed in Example I. However, no water was employed in the feed in these runs.

The results of these runs are summarized below in Table 10:

TABLE 10

| Run No. | Temp., °C. | Mol Ratio Dipropylene Glycol to Ammonia to Hydrogen | Mols Total Feed per 100 Grams Catalyst Per Hour | Conversion to Dimethyl-morpholine, percent | Yield to Dimethyl-morpholine, percent |
| --- | --- | --- | --- | --- | --- |
| 1 | 180–185 | 1:2.5:2.5 | 0.9 | 29.5 | 50.2 |
| 2 | 180–185 | 1:3:5 | 1.3 | 57.5 | 67.6 |
| 3 | 190–195 | 1:2.5:2.5 | 0.9 | 65.1 | 71.7 |
| 4 | 190–195 | 1:3:5 | 1.3 | 62.1 | 78.7 |
| 5 | 190–195 | 1:3:5 | 1.3 | 65.3 | 80.5 |
| 6 | 190–195 | 1:4:7 | 1.2 | 68.2 | 77.2 |

EXAMPLE IX

An attempt was made to prepare dimethylmorpholine by the reaction of commercial dipropylene glycol with ammonia in the absence of added hydrogen. The catalyst employed was 449 grams of Ni 0104 and the reactor system was that employed in Example I. No water was used in the dipropylene glycol feed.

The feed consisted of a mixture of dipropylene glycol and ammonia in the proportion of 1.0 mol dipropylene glycol to 5.0 mols ammonia and which was passed over the catalyst at the rate of 0.6 mol dipropylene glycol and 3.0 mols ammonia per hour. The temperature was maintained at 180–185° C. The reaction product was collected in two samples, sample No. 1 being the product of the first 17 hours of the run during which time 1360 grams of dipropylene glycol were fed to the reactor, and sample No. 2 being the product of the succeeding and final 24 hours of the run during which time 1868 grams of dipropylene glycol were fed to the reactor. These two product samples were fractionally distilled as described in Example I.

The dimethylmorpholine fraction from the distillation of product sample No. 1 weighed 202 grams, boiled from 140–150° C. and, based on its neutral equivalent of 119.6, was 96% dimethylmorpholine.

The dimethylmorpholine fraction from the distillation of product sample No. 2 weighed 220 grams, boiled from 140–150° C. and, based on its neutral equivalent of 122.5, was 94% dimethylmorpholine.

Based on the weight of dipropylene glycol charged, there was a 15% conversion and a 33% yield to dimethylmorpholine during the first 17 hours of the run. During the last 24 hours of the run conversion fell to 11% and yield dropped to 32% to dimethylmorpholine.

In view of the fact that the conversion obtained when hydrogen is not added to the feed is only about one-third to one-quarter of the conversion obtained in the presence of hydrogen, the use of hydrogen in the feed is an important feature of the method of this invention.

EXAMPLE X

A 93-hour continuous run was made to prepare dimethylmorpholine using commercial dipropylene glycol as the feed. The run was carried out following the procedure and with the equipment described in Example I. The reactor was charged with 605 grams (435 cc.) of Ni 0104 catalyst and the reaction was carried out at 190° C. An aqueous solution of dipropylene glycol was employed as the feed which consisted of 88.2 weight percent dipropylene glycol and 11.8 weight percent water. The reactants employed in this run were the aqueous solution of dipropylene glycol, hydrogen and ammonia, and were maintained in a molar ratio of 1 mol aqueous dipropylene glycol feed to 5 mols ammonia to 3 mols of hydrogen. The feed to the reactor per hour was 0.9 mol dipropylene glycol, 0.9 mol water, 4.5 mols ammonia and 2.7 mols of hydrogen.

Three samples of dimethylmorpholine product were collected successively after an initial 13.5 hour period that was used to line out the reaction system.

Product samples No. 1 and No. 2 were fractionally distilled in the manner described in Example I. The dimethylmorpholine fraction obtained from the distillation of product sample No. 1 boiled at 140–150° C., and had a neutral equivalent of 115.0. The dimethylmorpholine fraction obtained from the distillation of product sample No. 2 boiled at 140–148° C. and had a neutral equivalent of 114.5. Based on the weights of the dimethylmorpholine fractions and the weight of dipropylene glycol charged, there was a conversion of 77% and yield of 84% during the portion of the run represented by product sample No. 1, and there was a conversion of 72% and a yield of 81% during the portion of the run represented by product sample No. 2.

The dimethylmorpholine fraction obtained from product sample No. 1 was tested for the presence of unsaturated or reducible materials by ultraviolet and polarographic methods. The results of these tests are summarized below in Table 11. This dimethylmorpholine fraction was then hydrogenated and again tested by ultraviolet and polarographic methods and results thereof are also summarized below in Table 11. It will be noted that the hydrogenation procedure completely converted the reducible materials to dimethylmorpholine.

The hydrogenation of the dimethylmorpholine fraction was carried out by heating and stirring 2008 grams of the dimethylmorpholine fraction in the presence of 60 grams of Raney nickel catalyst in an electrically heated autoclave at 1200 p.s.i.g. hydrogen pressure for 4 hours at 150° C.

TABLE 11

| Sample Description | Ultraviolet 0.01 M Soln., Absorbency at— | | Polarograph 0.01 M Soln., Wave Height in Microamps at Half Wave Potentials | |
| --- | --- | --- | --- | --- |
| | 240 mu | 330 mu | 1.5 V | 1.75 V |
| Example X, Dimethylmorpholine Fraction, Product Sample No. 1 | 0.520 | 0.140 | 15.0 | 2.2 |
| Example X, Dimethylmorpholine Fraction, Product Sample No. 1, Hydrogenated | None | None | None | None |

It is apparent that the objectives of this invention have been accomplished. Broadly speaking, a new method of preparing substituted morpholines with high conversions and yields has been provided which comprises reacting a dialkylene glycol, defined so as to contain at least one secondary hydroxyl radical, with hydrogen and an aminating agent in vapor phase in the presence of a hydrogenation/dehydrogenation catalyst.

We claim:

1. A method of preparing substituted morpholines which comprises, vaporizing and heating a feed mixture comprising a dialkylene glycol, hydrogen and an aminating agent selected from the group consisting of ammonia, primary alkylamines having up to 18 carbon atoms and cyclohexylamine, said dialkylene glycol being selected from the group consisting of dialkylene glycols corresponding to the formula,

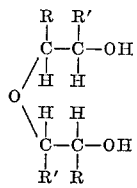

and dialkylene glycols corresponding to the formula,

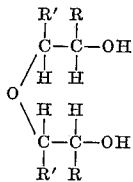

and mixtures thereof, wherein R is a radical selected from the group consisting of alkyl radicals, alkenyl radicals, alkoxymethyl radicals having 1 oxygen atom, phenyl, naphthyl, alkyl-substituted phenyl and alkyl-substituted naphthyl in which said alkyl substituent has no more than 4 carbon atoms, and phenyloxymethyl radicals having 1 oxygen atom, said alkyl, alkenyl and alkoxymethyl radicals having not more than 6 carbon atoms, R' is a member selected from the group consisting of hydrogen and R, and wherein R and R' can constitute a tetramethylene radical, and passing said vaporized and heated feed mixture in vapor phase at about atmospheric pressure over a metallic hydrogenation/dehydrogenation catalyst.

2. A method according to claim 1 wherein said catalyst is a cobalt hydrogenation/dehydrogenation catalyst.

3. A method according to claim 1 wherein said catalyst is a nickel hydrogenation/dehydrogenation catalyst.

4. A method in accordance with claim 1 wherein said dialkylene glycol is dipropylene glycol, said aminating agent is ammonia and said catalyst is a nickel hydrogenation/dehydrogenation catalyst.

5. A method in accordance with claim 4 wherein said dipropylene glycol, hydrogen and ammonia are passed over said catalyst at a temperature in the range of about 150 to about 250° C.

6. A method for preparing 3,5-dimethylmorpholine which comprises, passing 1,1'-oxydi-2-propanol, hydrogen and ammonia in the vapor phase over a nickel hydrogenation/dehydrogenation catalyst at a temperature of about 150 to about 250° C. at about atmospheric pressure.

7. A method in accordance with claim 8 wherein said nickel catalyst is a supported nickel hydrogenation/dehydrogenation catalyst and wherein said temperature is in the range of 175 to 200° C.

8. A method for preparing dialkyl-substituted morpholines which comprises, vaporizing and heating a feed mixture comprising ammonia, hydrogen, water and dipropylene glycol, and passing said feed mixture in vapor phase over a supported nickel catalyst at a temperature in the range of about 175 to 200° C. at about atmospheric pressure.

9. A continuous process for preparing dialkyl-substituted morpholines which comprises, vaporizing and heating a feed mixture consisting essentially of ammonia, hydrogen, water and dipropylene glycol, passing said feed mixture in vapor phase at about atmospheric pressure over a supported nickel hydrogenation/dehydrogenation catalyst and thereby producing a reaction product, recovering said reaction product, fractionally distilling said reaction product to produce dialkyl-substituted morpholines and unreacted dipropylene glycol, returning said unreacted dipropylene glycol to said feed mixture and recovering said dialkyl-substituted morpholines as the product of said process.

10. A method of preparing substituted morpholines, which comprises, vaporizing and heating a feed mixture comprising a dialkylene glycol, hydrogen, water and an aminating agent selected from the group consisting of ammonia, primary alkylamines having up to 18 carbon atoms and cyclohexylamine, said dialkylene glycol being selected from the group consisting of dialkylene glycols corresponding to the formula,

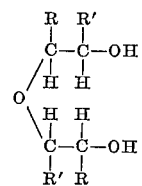

and dialkylene glycols corresponding to the formula,

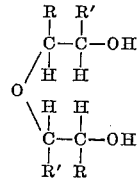

and mixtures thereof, wherein R is a radical selected from the group consisting of alkyl radicals, alkenyl radicals, alkoxymethyl radicals having 1 oxygen atom, phenyl, naphthyl, alkyl-substituted phenyl and alkyl-substituted naphthyl in which said alkyl substituent has no more than 4 carbon atoms, and phenyloxymethyl radicals having 1 oxygen atom, said alkyl, alkenyl and alkoxymethyl radicals having not more than 6 carbon atoms, R' is a member selected from the group consisting of hydrogen and R, and wherein R and R' can constitute a tetramethylene radical, and passing the resulting heated vapors of said feed mixture at about atmospheric pressure over a metallic hydrogenation/dehydrogenation catalyst.

11. A method in accordance with claim 10 wherein said aminating agent is ammonia and wherein the relative molar proportions of said dialkylene glycol, hydrogen and aminating agent in said feed mixture are at least 2 mols of said aminating agent per mol of said dialkylene glycol and an amount of hydrogen equal to at least about one-fifth the total amount of gases in the feed mixture, and wherein there is up to about 25 parts by weight of water per 100 parts by weight of dialkylene glycol.

12. A method for preparing 3,5-dimethylmorpholine which comprises, vaporizing and heating a feed mixture consisting essentially of ammonia, hydrogen, water and 1,1'-oxydi-2-propanol, and passing said vaporized and heated feed mixture at about atmospheric pressure over a metallic hydrogenation/dehydrogenation catalyst.

13. A method for preparing 2,5-dimethylmorpholine which comprises, vaporizing and heating a feed mixture comprising ammonia, hydrogen and 2 - (2 - hydroxypropoxy)-1-propanol, and passing said vaporized and heated feed mixture at about atmospheric pressure over a metallic hydrogenation/dehydrogenation catalyst.

14. A method of preparing 2-methyl-5-ethylmorpholine which comprises, vaporizing and heating a feed mixture comprising ammonia, hydrogen and 1 - (2 - hydroxypropoxy)-2-butanol, and passing said vaporized and heated feed mixture at about atmospheric pressure over a metallic hydrogenation/dehydrogenation catalyst.

15. A method of preparing 2,3,5-trimethylmorpholine which comprises, vaporizing and heating a feed mixture comprising ammonia, hydrogen and 2 - (2 - hydroxypropoxy)-3-butanol, and passing said vaporized and heated feed mixture at about atmospheric pressure over a metallic hydrogenation/dehydrogenation catalyst.

16. A method of preparing N-ethyldimethylmorpholine which comprises, vaporizing and heating a feed mixture comprising monoethylamine, hydrogen and dipropylene glycol, and passing said vaporized and heated feed mixture at about atmospheric pressure over a metallic hydrogenation/dehydrogenation catalyst.

17. A method of preparing substituted morpholines which comprises, vaporizing and heating a feed mixture consisting essentially of an aqueous solution of a dialkylene glycol, hydrogen, and an aminating agent selected from the group consisting of ammonia, primary alkylamines having up to 18 carbon atoms and cyclohexylamine, said dialkylene glycol selected from the group consisting of dialkylene glycols corresponding to the formula,

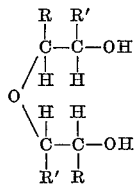

and dialkylene glycols corresponding to the formula,

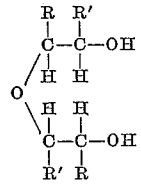

and mixtures thereof, wherein R is a radical selected from the group consisting of alkyl radicals, alkenyl radicals, alkoxymethyl radicals having 1 oxygen atom, phenyl, naphthyl, alkyl-substituted phenyl and alkyl-substituted naphthyl in which said alkyl substituent has no more than 4 carbon atoms, and phenyloxymethyl radicals having 1 oxygen atom, said alkyl, alkenyl and alkoxymethyl radicals having not more than 6 carbon atoms, R' is a member selected from the group consisting of hydrogen and R, and wherein R and R' can constitute a tetramethylene radical, passing the resulting vaporized and heated feed mixture at about atmospheric pressure over a metallic hydrogenation/dehydrogenation catalyst to produce a crude substituted morpholine product, fractionally distilling said crude substituted morpholine product to produce a substituted morpholine fraction, and heating said substituted morpholine fraction with hydrogen in the presence of a metallic hydrogenation catalyst under superatmospheric pressure.

18. A method of preparing substituted morpholines which comprises, vaporizing and heating a feed mixture comprising a dialkylene glycol, hydrogen and an aminating agent selected from the group consisting of ammonia, primary alkylamines having up to 18 carbon atoms and cyclohexylamine, said dialkylene glycol being selected from the group consisting of dialkylene glycols corresponding to the formula,

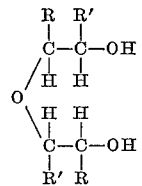

and dialkylene glycols corresponding to the formula,

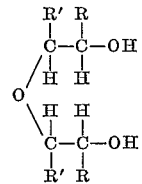

and mixtures thereof, wherein R is a radical selected from the group consisting of alkyl radicals, alkenyl radicals, alkoxymethyl radicals having 1 oxygen atom, phenyl, naphthyl, alkyl-substituted phenyl and alkyl-substituted naphthyl in which said alkyl substituent has no more than 4 carbon atoms, and phenyloxymethyl radicals having 1 oxygen atom, said alkyl, alkenyl and alkoxymethyl radicals having not more than 6 carbon atoms, R' is a member selected from the group consisting of hydrogen and R, and wherein R and R' can constitute a tetramethylene radical, passing said vaporized and heated feed mixture in vapor phase over a metallic hydrogenation/dehydrogenation catalyst, recovering a substituted morpholine product, and heating said substituted morpholine product with hydrogen in the presence of a metallic hydrogenation catalyst under superatmospheric pressure.

References Cited in the file of this patent
UNITED STATES PATENTS

| | | |
|---|---|---|
| 2,001,584 | Reed | May 14, 1935 |
| 2,194,906 | Krzikalla | Mar. 26, 1940 |
| 2,412,209 | Dickey et al. | Dec. 10, 1946 |
| 2,421,650 | Reppe | June 3, 1947 |
| 2,519,560 | Fowler | Aug. 22, 1950 |
| 2,636,032 | Weston et al. | Apr. 21, 1953 |
| 2,748,143 | Erickson | May 29, 1956 |
| 2,754,330 | Schreyer | July 10, 1956 |

FOREIGN PATENTS

| | | |
|---|---|---|
| 791,744 | Great Britain | Mar. 12, 1958 |

OTHER REFERENCES

Hill et al., Jour. A.C.S. vol. 60, pp. 1033–1035 (1938).